Aug. 20, 1935. C. OBEROSLER 2,012,200
PISTON RING EXPANDER AND COMPRESSOR
Filed April 19, 1935
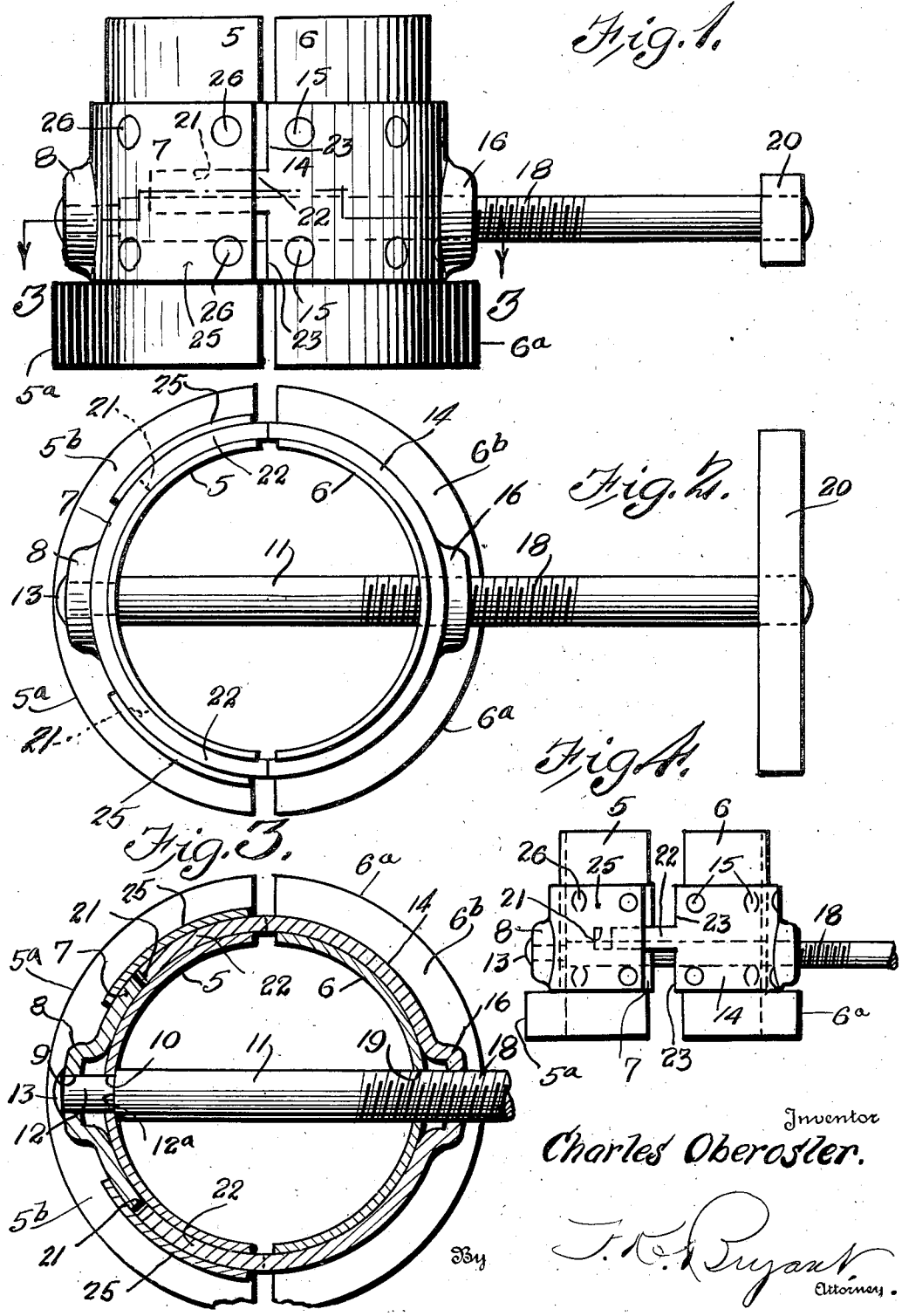
Inventor
Charles Oberosler.

Patented Aug. 20, 1935

2,012,200

UNITED STATES PATENT OFFICE 2,012,200

PISTON RING EXPANDER AND COMPRESSOR

Charles Oberosler, Loveland, Colo.

Application April 19, 1935, Serial No. 17,205

5 Claims. (Cl. 29—86.4)

This invention relates to improvements in piston ring expanders and applying tool.

The primary object of this invention is to provide a tool of the above mentioned character which may be contracted for receiving a piston ring which after being seated may be expanded so that the tool may be positioned upon the piston of the engine and brought into alignment with the piston grooves so that the ring may be slipped off of the semi-cylindrical portion and may spring into the piston ring seat.

A further object of this invention is to provide a tool of the above mentioned character which is intended to be used in connection with expansible piston rings for inserting the same upon the piston of an internal combustion engine without the liability of the ring becoming broken upon its insertion.

A still further object of this invention is to provide a piston ring expanding tool so constructed and arranged as to receive a piston ring or rings of varied sizes, in diameter.

Other objects and advantages of the invention will become apparent during the course of the following description, forming a part of the specification and taken with the drawing, wherein, Figure 1 is a side plan view of the piston expander illustrating the semi-cylindrical portions partially separated and showing the manner in which the semi-cylindrical portions are guided toward and away from each other without becoming out of alignment;

Figure 2 is a top plan view of the piston ring expander further illustrating the manner in which the semi-cylindrical portions are guided toward and away from each other and showing the screw threaded operating rod for moving the semi-cylindrical portions toward and away from each other;

Figure 3 is a transverse cross-sectional view taken on line 3—3 of Figure 1, looking in the direction of the arrows and further illustrating the manner in which the semi-cylindrical portions of the piston ring expander are guided by the sliding frame pieces; and Figure 4 is a side plan view of the piston ring expander showing the semi-cylindrical members separated and illustrating the manner in which the frame pieces guide the cylindrical portions toward and away from each other.

Referring more in detail to the drawing, wherein for the purpose of illustrating the invention, the reference characters 5 and 6 will generally be employed to designate a pair of semi-cylindrical sheet metal portions or members of a size when placed together to form a circle of a diameter of sufficient size to receive a piston ring upon the external portion while the inner diameter of the cylindrical member 5 may be of sufficient dimension to receive a piston as used in present day motor vehicle.

Secured to the semi-cylindrical member 5 is a correspondingly shaped member 7 secured in place by a rivet or other fastening element. The frame member 7 is provided with a boss 8 at the intermediate portion thereof and is provided with an opening 9 in alignment with an opening 10 formed in the semi-cylindrical ring supporting member 5 for the passage of a screw threaded rod 11 having a restricted or reduced portion 12. The shoulder 12a of the reduced portion 12 abuts against the inner face of the semi-cylindrical member 5, while the free end of the restricted portion 12 is swaged or overturned as at 13 for cooperation with the shoulder 12a to retain the screw threaded rod against longitudinal movement but allow free rotation thereof.

The opposite semi-cylindrical member 6 is provided with a similar frame member 14 which is secured in place by rivets 15 or other fastening elements and said frame member 14 is also provided with an apertured boss 16 having internal threads adapted to engage the threads 18 formed on the screw threaded rod 11. An opening 19 is formed in the semi-cylindrical member 6 in direct alignment with the apertured boss 16 so that by operation of the handle 20 secured to the extended end of the screw threaded rod 11, the frame portions 7 and 14 may be moved toward and away from each other in accordance with the rotation of the screw threaded rod 11.

Each of the frame members 7 and 14 is substantially identical in configuration with the exception that the frame member 7 is provided with slotted ends 21 for receiving opposite tongues 22 formed on the semi-cylindrical frame member 14 as by cutting away the end portions of the semi-cylindrical frame members 14 as at 23. The tongues 22 are capable of sliding into and out of the slits 21 formed in the opposite ends of the semi-cylindrical frame member 7 in order to guide the semi-cylindrical ring receiving members 5 and 6 when being moved toward and away from each other.

The guide tongues 22 are retained in the grooves 21 by means of plates 25 placed over the slits 21 as shown clearly in Figs. 2, 3, and 4 and said plates 25 are held in position by rivets 26 which also perform the function of holding the semi-cylindrical piston ring receiving member 5 to the correspondingly shaped frame member 7.

For a consideration of the operation of the device, it will be assumed that the operator desires to place new piston rings upon the piston of an engine which has been used and which have been removed from the cylinder block of the engine.

The first step in the operation of the device is to place the piston ring against the semi-cylindrical portions 5 and 6 when they are in their contracted positions and by operation of the handle 20 in a clockwise direction and semi-cylindrical members 5 and 6 will be moved away from each other to expand the piston rings placed thereon whereupon the members 5 and 6 may be continued in their outward motion or movement until the interior diameter is of a size over that of the piston so that the semi-cylindrical members 5 and 6 may be slipped upon the piston and the lower edge may be brought into alignment with the piston ring groove seat whereby the piston ring may be removed from the semi-cylindrical portions 5 and 6 and slipped into the ring groove seat without causing breakage or damage thereto.

The device is also useful when inserting the piston with the rings thereon into the cylinder bore of the engine by placing the semi-spherical portions 5 and 6 over the piston ring after it has been seated to hold the ring compressed so that the piston with its ring may be inserted in the bore while the piston rings are in their contracted positions.

It has been found in practice that the top and bottom portions of the semi-cylindrical ring receiving members 5 and 6 may be formed of different diameters to accommodate a large number of piston ring sizes whereby the upper and lower ends of the semi-cylindrical members 5 and 6 may be interchangeably used. As illustrated, the semi-cylindrical members 5 and 6 are annularly enlarged at one end as at 5a and 6a respectively and the enlargements are connected to the member by the shoulders 5b and 6b. With a structure of this character the device may be used for the placement of piston rings on pistons of different diameters, such as pistons measuring two and one half or three inches.

It is to be understood that the form of the invention herewith shown and described is to be taken as the preferred embodiment of the same and that various changes in the shape, size and arangement of parts may be resorted to without departing from the spirit and scope of the invention as claimed.

I claim:—

1. A piston ring expander comprising a pair of semi-cylindrical members arranged in circle formation, a correspondingly shaped frame member secured to the outer surface of each of the semi-cylindrical members, guide tongues formed on one of the frame members at each end thereof, said guide members being adapted to be received within slits formed in the end portions of the opposite frame member and means for moving the frame members away and toward each other.

2. A piston ring expander comprising a pair of semi-cylindrical members arranged in circle formation, to receive a piston ring on the outer surface thereof, a guide frame member secured to the intermediate portion of each of the semi-cylindrical spring receiving members, means on each end of each frame guide member for holding the semi-cylindrical ring receiving members in circle formation while being moved toward and away from each other, and means for moving the guide frame members toward and away from each other.

3. A piston ring expander and contractor comprising a pair of semi-cylindrical members arranged in circle formation, guide frame members secured to the intermediate portions of each semi-cylindrical member, each of said guide frame members being of the same configuration as the semi-cylindrical ring receiving members, a pair of tongues formed on one of the guide frame members, the other guide frame member having slots for receiving said tongues, a screw threaded rod having one of its ends anchored against longitudinal movement to one of said frame members and the opposite end of the screw threaded rods being threaded in the other guide frame member, whereby rotation of said screw threaded rod will cause the semi-cylindrical members to be moved toward and away from each other, in accordance with the direction of rotation.

4. A piston ring expander and compressor comprising a pair of semi-cylindrical members arranged in circle formation, a guide frame member secured to the intermediate portion of each of the semi-cylindrical members, one of said guide frame members having its ends slotted, tongues formed on the opposite guide frame member adapted to be received within the slots, plates secured over the openings or slots formed in the ends of the slotted guide frame member and means for moving the guide frame members toward and away from each other.

5. A piston ring expander comprising a pair of semi-cylindrical members, a pair of correspondingly shaped frame members secured thereto, means carried by the frame members for guiding the semi-cylindrical members during their movement toward and away from each other and means for moving the semi-cylindrical frame members toward and away from each other, and the semi-cylindrical members being of stepped formation with corresponding ends of increased diameter whereby the expander may be used with pistons of different diameters.

CHARLES OBEROSLER.